US011275901B2

(12) United States Patent
Shek et al.

(10) Patent No.: US 11,275,901 B2
(45) Date of Patent: Mar. 15, 2022

(54) CONTEXT RETRIEVAL FOR CHATBOTS

(71) Applicant: INTERNATIONAL BUSINESS MACHINES CORPORATION, Armonk, NY (US)

(72) Inventors: Elinna Shek, Ashburn, VA (US); Chengmin Ding, Chantilly, VA (US); Octavian Florin Filoti, Portsmouth, NH (US); Stanley John Vernier, Grove City, OH (US); Renee F Decker, Brunswick, MD (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/701,263

(22) Filed: Dec. 3, 2019

(65) Prior Publication Data

US 2021/0165967 A1    Jun. 3, 2021

(51) Int. Cl.
*G06F 17/00* (2019.01)
*G06F 40/30* (2020.01)
*G06F 40/295* (2020.01)

(52) U.S. Cl.
CPC ............ *G06F 40/30* (2020.01); *G06F 40/295* (2020.01)

(58) Field of Classification Search
None
See application file for complete search history.

(56) References Cited

U.S. PATENT DOCUMENTS

| | | | | |
|---|---|---|---|---|
| 9,647,968 | B2 * | 5/2017 | Smullen | H04L 67/02 |
| 10,015,124 | B2 * | 7/2018 | McGregor, Jr. | H04L 51/02 |
| 10,078,651 | B2 | 9/2018 | Kelly | |
| 10,187,337 | B2 * | 1/2019 | Smullen | H04L 12/185 |
| 10,412,030 | B2 * | 9/2019 | McGregor, Jr. | G06K 9/726 |
| 2017/0250930 | A1 * | 8/2017 | Ben-Itzhak | G06F 3/011 |
| 2018/0197104 | A1 | 7/2018 | Marin | |
| 2018/0212904 | A1 * | 7/2018 | Smullen | H04L 63/18 |
| 2018/0293483 | A1 * | 10/2018 | Abramson | G06N 3/006 |
| 2019/0034780 | A1 | 1/2019 | Marin | |

OTHER PUBLICATIONS

Chen et al., "Continuous Knowledge Learning in Chatbots," Chapter 8 in "Lifelong Machine Learning," Morgan & Claypool Publishers, 2018, pp. 1-9.

(Continued)

*Primary Examiner* — Satwant K Singh
(74) *Attorney, Agent, or Firm* — Tihon Poltavets (57) ABSTRACT

A method for supplementing context in dialog flows for chatbot systems includes responsive to receiving identification information associated with a user and a topic for a chatbot conversation, initializing a chatbot conversation between a chatbot and the user. The method identifies a set of entities and a set of one or more relationships, wherein each relationship from the set one or more relationships is between two entities from the set of entities. The method determines an initial set of relevancy scores for each entity in the set of entities and the set of one or more relationships, wherein the initial set of relevancy scores are based at least on a domain for the topic of the chatbot conversation. The method generates a first response to the user based on the initial set of relevancy scores, wherein the first response includes at least one entity and at least one relationship.

18 Claims, 7 Drawing Sheets

(56) References Cited

OTHER PUBLICATIONS

Fulda et al., "BYU-EVE: Mixed Initiative Dialog via Structured Knowledge Graph Traversal and Conversational Scaffolding." Amazon Alexa Prize Proceedings, Nov. 2018. https://m.media-amazon.com/images/G/01/mobile-apps/dex/alexa/alexaprize/assets/pdf/2018/Eve.pdf, pp. 1-20.
He et al., "Learning Symmetric Collaborative Dialogue Agents with Dynamic Knowledge Graph Embeddings," (Submitted on Apr. 24, 2017), https://arxiv.org/abs/1704.07130, pp. 1-18.
Hixon et al., "Learning Knowledge Graphs for Question Answering through Conversational Dialog," Human Language Technologies: The 2015 Annual Conference of the North American Chapter of the ACL, , Denver, Colorado, May 31-Jun. 5, 2015, pp. 851-861.
Hung et al., "Towards a Context-Based Dialog Management Layer for Expert Systems," 2009 International Conference on Information, Process, and Knowledge Management, Cancun, 2009, pp. 60-65.
Mani et al., "Hi, how can I help you?: Automating enterprise IT support help desks," (Submitted on Nov. 2, 2017) https://arxiv.org/abs/1711.02012, pp. 1-9.
Mell et al., "The NIST Definition of Cloud Computing", National Institute of Standards and Technology, Special Publication 800-145, Sep. 2011, pp. 1-7.
Padhee et al., "Creating Real-Time Dynamic Knowledge Graphs." Wright State University, Jul. 2018. https://corescholar.libraries.wright.edu/knoesis/1143, pp. 1-2.

* cited by examiner

CONTEXT RETRIEVAL FOR CHATBOTS

BACKGROUND OF THE INVENTION

This disclosure relates generally to chatbot systems, and in particular to capturing entities and associations between the entities to supplement context in dialog flows for chatbot systems.

Chatbots are software programs capable of conducting a conversation with a human end user utilizing auditory or textual methods. Chatbot are designed to simulate human behavior as conversational partners when engaging the human end user and are typically utilized in dialog systems for various applications including customer service and information acquisition. Chatbots scan for keywords within a conversational input by the human end user and then generate a reply based on matching keywords or word patterns found in a database. More sophisticated chatbots utilize natural language processing to extract and analyze keywords within the conversational input, prior to generating a reply to the human end user. Transcripts for each conversation are typically collected for logging, post-processing, and further analytics to improve an accuracy of future responses by the chatbot.

SUMMARY

Embodiments in accordance with the present invention disclose a method, computer program product and computer system for supplementing context in dialog flows for chatbot systems, the method, computer program product and computer system can responsive to receiving identification information associated with an end user and a topic for a chatbot conversation, initialize a chatbot conversation between a chatbot and the end user. The method, computer program product and computer system can identify a set of entities and a set of one or more relationships provided by the end user in the identification information and the topic, wherein each relationship from the set one or more relationships is between two entities from the set of entities. The method, computer program product and computer system can determine an initial set of relevancy scores for each entity in the set of entities and the set of one or more relationships, wherein the initial set of relevancy scores are based at least on a domain for the topic of the chatbot conversation. The method, computer program product and computer system can generate a first response to the end user based on the initial set of relevancy scores, wherein the first response includes at least one entity from the set of entities and at least one relationship from of the set of one or more relationships.

DETAILED DESCRIPTION

Present chatbot program focus on data mining and information retrieval with a goal of determining a topic of a chat. Entities and associations between entities (i.e., relationships) acquired through conversation with a human end user are utilized for mapping knowledge networks and analytics purposes. This knowledge networks can be utilized as the bases for a conversational chatbot. Embodiments of the present invention improve on present chatbot programs by providing an active curation of entities and relationships, in conjunction with curated knowledge store for generating more personalized dialog. In addition to the active curation of entities and relationships, relevancy scores for each of the entities and relationships can allow the chatbot to generate clarification questions for information provided by the human end user, rather than utilizing the information as provide. Embodiments of the present invention generate a prerequisite knowledge store, update the prerequisite knowledge store with entities and relationships provided by a human end user engaging in the chatbot conversation, and supplement the dialog with the entities and relationships based on updated relevancy scores.

For generating the prerequisite knowledge store, embodiments of present invention prepopulate an existing knowledge with common entities and relationships by extracting the entities and relationships from unstructured and structured data sources (e.g., Wikipedia, DBPedia). Embodiments of present invention assign relevancy scores to the common entities and relationships in conversation based on a frequency of word utilization in the common English language and utilized in the domain topic. Embodiments of present invention expand the knowledge store with the information in the chatbot conversation by expanding entities and relationships within the chatbot system (i.e., text, intent, entities, and responses) and assign a higher relevancy score to information in the chatbot conversation when compared to the common entities and relationships. Furthermore, the relevancy scores are updated based on historical frequency of entities and relationships that appear in dialog nodes from the previously stored chatbot conversations.

For updating the prerequisite knowledge store with entities and relationships provided by a human end user, embodiments of present invention expand the knowledge store with entities and relationships from a current conversation with the human end user and increases relevancy scores for the entities and relationship being mentioned in the current conversation. For supplementing the dialog with the entities and relationships based on the updated relevancy scores, embodiments of the present invention generate tailored responses to the human end-user by inserting entities into the dialog to personalize the chatbot conversation. The subset of the knowledge store and the updated relevancy scores allows for the determination of which entity and relationship to utilize in the generating the tailored response. For a dialog missing an entity or relationship and/or for low relevancy score, embodiments of the present invention can query the human end user for additional information via a clarification question, where a confirmation or disconfirmation (i.e., rejection) to the clarification question further updates the relevancy scores.

Figure 1:
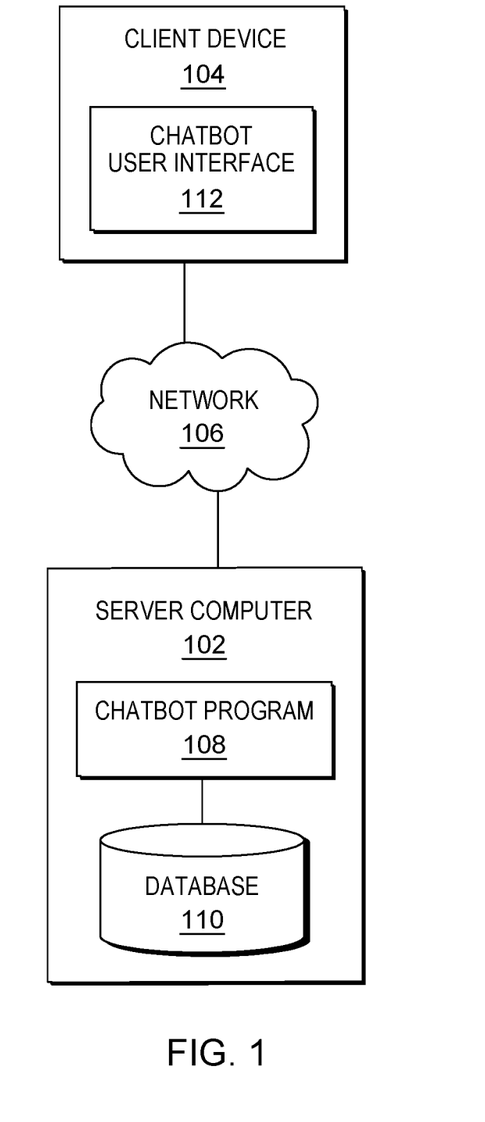
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102 and client device 104, interconnected over network 106. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a personal digital assistant (PDA), a smart phone, or any programmable electronic device capable of communicating with client device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within the distributed data processing environment. Server computer 102 includes chatbot program 108 and database 110. Server computer 102 may include internal and external hardware components, as depicted and described in further detail with respect to FIG. 4.

Client device 104 can be a laptop computer, a tablet computer, a smart phone, smart watch, a smart speaker, or any programmable electronic device capable of communicating with various components and devices within the distributed data processing environment, via network 106. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 106. In one embodiment, client device 104 represents one or more devices associated with a user. Client device 104 includes an instance of user interface 112 for interacting with chatbot program 108 on server computer 102.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between server computer 102 and client device 104, and other computing devices (not shown) within the distributed data processing environment.

Chatbot program 108 is a software that conducts a conversation with a user of client device 104 utilizing auditory or textual methods. Chatbot program 108 utilizes natural language processing systems to scan for keywords within audible and/or textual inputs from a user and generate an appropriate reply based on the audible and/or textual inputs. Chatbot program 108 further utilizes identified entities and relationships within the audible and/or textual inputs to establish relevancy score and subsequently, update the relevancy scores to tailor responses to the user. Prior to engaging with a user of client device 104, chatbot program 108 can generate a prerequisite knowledge store and updates the prerequisite knowledge store based on information associated with the chatbot. Chatbot program 108 can initialize a chatbot conversation with a user and identify present entities and relationships. Chatbot program 108 can determine an initial set of relevancy scores for the present entities and relationships and generate a response based on the initial set of relevancy scores. Chatbot program 108 can receive a response from the user and update the initial set of relevancy scores based on the response from the user. Subsequently, chatbot program 108 can generate a response or perform an action based on the updated set of relevancy scores.

Database 110 is a repository for data used by chatbot program 108. In the depicted embodiment, database 110 resides on server computer 102. In another embodiment, database 110 may reside on client device 104 or elsewhere within the distributed data processing environment provided chatbot program 108 has access to database 110. A database is an organized collection of data. Database 110 can be implemented with any type of storage device capable of storing data and configuration files that can be accessed and utilized by chatbot program 108, such as a database server, a hard disk drive, or a flash memory. Database 110 stores data used by chatbot program 108, such as word entities, relationships, user profiles, word banks, relevancy scores, prerequisite knowledge store, and the like.

User interface 112 enables a user to make requests of or issue commands to client device 104 and receive information and instructions in response. In one embodiment, a user of client device 104 accesses user interface 112 via voice commands in natural language. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software. In an example, mobile application software, or an "app," is a computer program designed to run on smart phones, tablet computers and other mobile devices. User interface 112 enables a user of client device 104 to interact with chatbot program 108.

Figure 2:
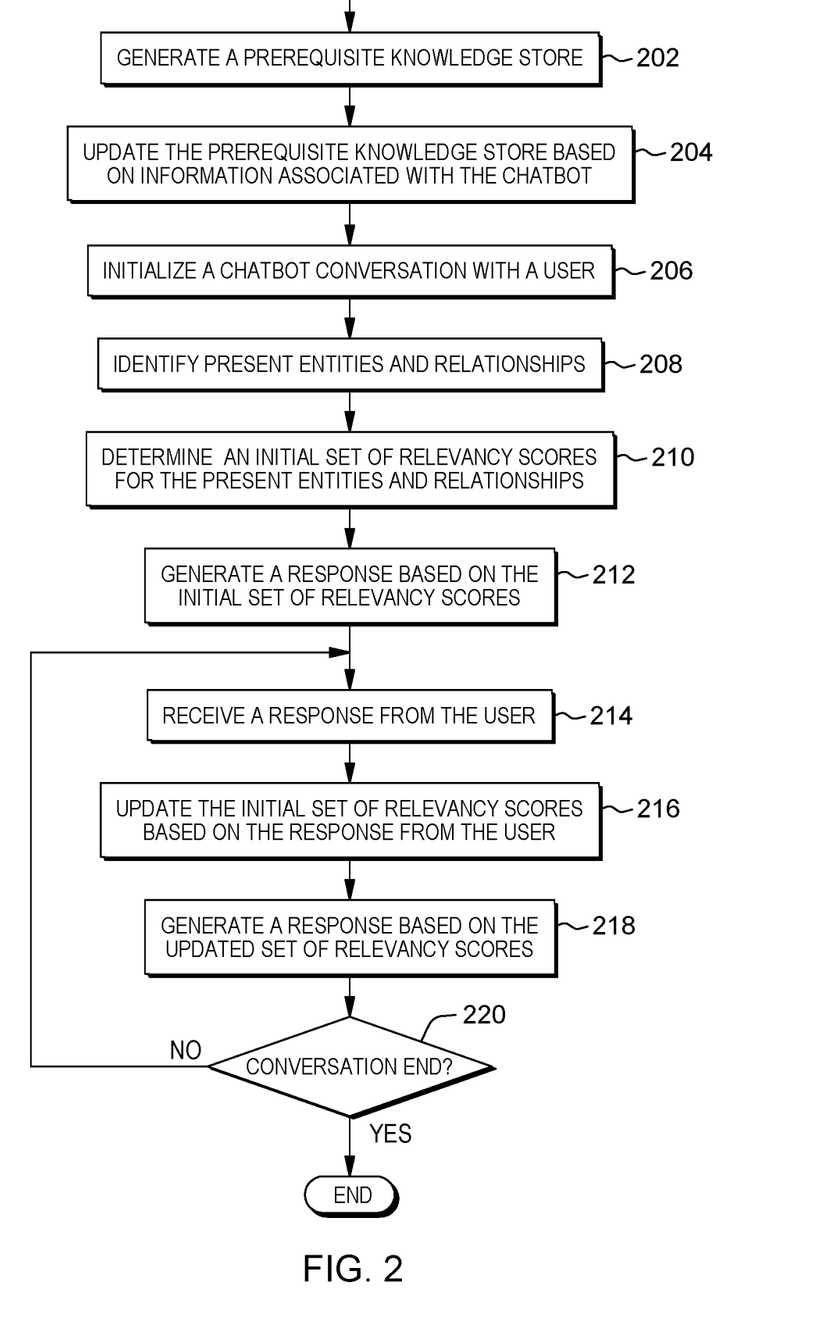
FIG. 2 is a flowchart depicting operational steps of a chatbot program for context retrieval utilizing captured entities and relationships, in accordance with an embodiment of the present invention.

FIG. 2 is a flowchart depicting operational steps of a cluster compliance program for route management of a vehicle based on multiple sets of rules, in accordance with an embodiment of the present invention.

Chatbot program 108 generates (202) a prerequisite knowledge store. Chatbot program 108 populates the prerequisite knowledge store with structured and unstructured data from publicly available sources, such as Wikipedia and DBPedia. Chatbot program 108 extracts entities and relationships from the structure and unstructured data and rates relevancy scores for the entities and relationships based on a frequency of usage and utilization in a topic domain. For words with a high frequency of usage such as, "the", "and", "a", chatbot program 108 assigns a low relevancy score as an initial starting point for generating the prerequisite knowledge store. For domain ontology banks (e.g., glossary, acronym, classification/hierarchical word lists), chatbot program 108 assigns higher relevancy scores for the words present in the domain ontology banks. For pronouns and nouns referring to items such as, objects, people, and characters, chatbot program 108 assigns higher relevancy scores for those pronouns and nouns as well. If chatbot program 108 establishes relationship connections to an actual entity, chatbot program 108 increases or decreases the relevancy score based on the actual entity relevancy.

Chatbot program 108 updates (204) the prerequisite knowledge store based on the information associated with the chatbot. Chatbot program 108 updates the prerequisite knowledge store by expanding the entities and relationships for an application specific implementation. Chatbot program 108 can analyze previous conversations between a user and chatbot or between a user and a human representative (e.g., customer service) and utilize the previous conversations to update the prerequisite knowledge store by expanding on the entities and relationships. Chatbot program 108 can expand entities and relationships from text present in the previous conversations and assign higher relevancy scores to the entities and relationships captured in the previous conversations versus the entities and relationship based on the structured and unstructured data gathered from the publicly accessible sources in (202). In one example, "fridge" is a domain term that chatbot program 108 groups in "appliances" in the entities section and not based on the data gathered from the publicly accessible sources. Therefore, chatbot program 108 assigns a higher relevancy score since "fridge" was a focus of dialog in the previous conversations versus based on the data gathered from the publicly accessible sources. Chatbot program 108 can update relevancy scores with historical frequency of entities and relationships that frequently appear in dialog nodes with the users engaging in the conversations. A number of times a specific term associated with an entity or relationship appears in the dialog, chatbot program 108 increase the relevancy score for the specific term.

In one example, chatbot program 108 is associated with providing customer service for Company A. For a topic of "Hours of Operation" for Company A, chatbot program 108 can recognize "#Customer_Care_Store_Hours" based on previous examples from user conversations that includes question such as, "are you closed New Year's Day?" and "are you open on Thanksgiving?". Chatbot program 108 can discover entities such as, "New Year's Day" and "Thanksgiving" from the previous examples from user conversations and associate the entities with a relationship, "holidays".

Chatbot program 108 assigns higher relevancy scores to discovered entities that have a strong association with a specific relationship such as, "Thanksgiving" and "holiday". Chatbot program 108 assigns lower relevancy scores to discovered entities that have a weak association with a specific relationship such as, "Tuesday" and "holiday". Though "Tuesday" is not directly associated with a "holiday", depending on the year, "New Year's Day" can fall on a "Tuesday". Therefore, chatbot program 108 assigns a lower relevancy score for the association between "Tuesday" and "holiday", until chatbot program 108 can confirm via a conversation with the user or querying an online source for current date information, whether "New Year's Day" is on "Tuesday".

Chatbot program 108 initializes (206) a chatbot conversation with a user. In this embodiment, chatbot program 108 prompts a user via a user interface to enter basic identification information and a topic to be discussed during the chatbot conversation. The basic identification information can include a first name, a last name, a username, an associated email account, an associated account number, and/or an associated telephone number. The topic can be presented in the form of a question, statement, sentence, word or collection of words. Subsequent to receiving an input via the user interface from the user to initiate the chatbot conversation, chatbot program 108 initializes the chatbot conversation with the user. Chatbot program 108 can further include a CAPTCHA (Completely Automated Public Turing test to tell Computers and Humans Apart) type of challenge-response test to verify a human user, prior to initializing the chatbot conversation.

Chatbot program 108 identifies (208) present entities and relationships. Chatbot program 108 utilizes the basic identification information and the topic previously inputted by the user to extract one or more entities and one or more relationships based on a prepopulated knowledge store. In one example, chatbot program 108 receives basic identification information via a chatbot interface that includes a first name, "John" and a last name, "Doe", where a topic includes a statement, "My son's cellphone is broken". Chatbot program 108 identifies the entities by determining which of the present terms exceed a base relevancy threshold. Chatbot program 108 utilizes the prerequisite knowledge store to identify each term and an associated base relevancy score, where chatbot program 108 compares the associated base relevancy score for each term to the base relevancy threshold. Chatbot program 108 identifies the following terms and associated base relevancy scores: "John" (name, noun)=0.2, "Doe" (name, noun)=0.2, "chatbot"=0.01, "My"=0.001, "son" (noun, title)=0.05, "cellphone" (domain word)=0.05, "is"=0.00001, "broken" (domain word)=0.02. In this example, chatbot program 108 utilizes a relevancy threshold equal to 0.01, where the terms "John", "Doe", "chatbot", "son", "cellphone", and "broken" exceed the relevancy threshold. Chatbot program 108 identifies a first relationship, where "John Doe" is a user of "chatbot". Chatbot program 108 identifies a second relationship, where "son" is the son of "John Doe". Chatbot program identifies a third relationship, where "son" is the owner of "cellphone".

Chatbot program 108 determines (210) an initial set of relevancy scores for the present entities and relationships. Chatbot program 108 determines the initial set of relevancy scores based on the prerequisite knowledge store and a domain of the chatbot conversation. Continuing from the previously discussed example, chatbot program 108 determines an initial set of relevancy score for the entities "John Doe", "chatbot", "son", and "cellphone" and the relationships. In this example, the relevancy score ranges from 0 to 1, where 1 is the highest relevancy score and 0 is the lowest relevancy score. For the first relationship, chatbot program 108 determines a relevancy score of 0.7 for "John Doe" and 0.2 for "chatbot", where a relevancy score for the first relationship between "John Doe" and "chatbot" is 0.9. For the second relationship, chatbot program 108 determines a relevancy score of 0.8 for "son", where a relevancy score for the second relationship between "John Doe" and "son" is 0.8. For the third relationship, chatbot program determines a relevancy score of 0.5 for "cellphone", where a relevancy score for the third relationship between "son" and "cellphone" is 0.6.

Chatbot program 108 generates (212) a response based on the initial set of relevancy scores. Chatbot program 108 generates a response tailored to the user engaging in the chatbot conversation by incorporating terms associated with the initial set of relevancy scores for the present entities and relationships. Continuing from the previously discussed example, chatbot program 108 generates a response, "Hi John, my name is Jane. I see that your son is having issues with a broken cellphone. Is the correct?". Since, chatbot program 108 previously determined a relevancy score of 0.8 for the second relationship between "John Doe" and "son", chatbot program 108 incorporates the second relationship of "son" being the son of "John Doe" into the tailored response. Chatbot program 108 includes a first portion of the generate response stating, "your son" directed at "John" who is engaging in the chatbot conversation. Since, chatbot program 108 previously determines a relevancy score of 0.6 for the third relationship between "son" and "cellphone", chatbot program 108 incorporates the third relationship of "son" being the owner of "cellphone" into the tailored response. Chatbot program 108 includes a second portion of the generated response stating, "your son is having issues with a broken cellphone". Chatbot program 108 has the ability to associate the term "broken" with an "issue" and further tailor the response directed towards the user (i.e., "John Doe"). Chatbot program 108 further includes a question in the generated response directed to the user, where chatbot program 108 utilizes a received response from the user to confirm that the generated response is properly tailored to the user engaging in the chatbot conversation.

Chatbot program 108 receives (214) a response from the user. As previously discussed, chatbot program 108 includes a question in the generated response directed to the user and chatbot program 108 parses the received response for an answer to the question included in the generated response. Chatbot program 108 can receive a response in the form of one or more entries (i.e., one or more sent messages) by the user engaging in the chatbot conversation. For example, a first entry of the response from the user is directed to the question (e.g., "yes", "no", "I don't know") and second entry of the response from user includes a further explanation and/or clarification statement. Chatbot program 108 can utilize a time threshold and/or a status (e.g., user is currently typing) to determine when a user has provided all the entries for associated with the received response from the user. Continuing from the previously discussed example, chatbot program 108 can receive a response with a single entry from the user stating, "Yes. The phone was dropped into a sink filled with water and now the phone won't turn on." Alternately, chatbot program 109 can receive a response with multiple entries from the user stating, where the first entry states "Yes" and the second entry states, "The phone was dropped into his dorm room sink filled with water and now the phone won't turn on."

Chatbot program 108 updates (216) the initial set of relevancy scores based on the response from the user. Chatbot program 108 parses the response received from the user to determine if a confirmation (e.g., "yes", "yep", "of course"), a rejection (e.g., "no", "nope", "never"), and/or neutral reaction (e.g., "not sure", "I don't know", "maybe") is present in the response to the question previous presented to the user in (212). Based on whether the response includes a confirmation, rejection, and/or neutral reaction, chatbot program 108 updates the initial set of relevancy scores. Furthermore, chatbot program 108 parses the response received from the user to identify one or more instances where the user mentions the present entities and/or relationships identified in (208). Based on the one or more instances, chatbot program 108 updates the initial set of relevancy scores. Continuing from the previously discussed example, chatbot program 108 receives the following response from the user, "Yes. The phone was dropped into his dorm room sink filled with water and now the phone won't turn on." Chatbot program 108 parses the response and identifies a confirmation (i.e., "Yes.") to the previously presented question. Chatbot program 108 utilizes the confirmation to update the relevancy score for the second relationship between "John Doe" and "son" from 0.8 to 0.9, since the confirmation is at least partially directed to the "son" being the son of "John Doe". Chatbot program 108 further utilizes the confirmation to update the relevancy score for the third relationship between "son" and "cellphone" from 0.6 to 0.8, since the confirmation is at least partially directed to the "son" being the owner of "cellphone". Furthermore, chatbot program 108 updates the relevancy score for "son" from 0.8 to 0.95 and the relevancy score for "cellphone" from 0.5 to 0.7.

Chatbot program 108 generates (218) a response based on the updated set of relevancy scores. Chatbot program 108 generates a response that includes two portions based on the updated set of relevancy scores, where a first portion includes an empathic response directed to the issue of the broken cellphone not being able to turn on and a second portion directed to a potential resolution to the issue of the broken cellphone not being able to turn on. Continuing from the previously discussed example, chatbot program 108 generates a response based on the updated set of relevancy scores that states, "I'm sorry to hear that your son is not able to turn on the phone. What is your son's address? We can send a replacement phone to his dorm." The first portion of the response that chatbot program 108 generates includes the empathic response of, "I'm sorry to hear that your son is not able to turn on the phone." Chatbot program 108 utilizes the relevancy scores to re-enforce the third relationship of "son" being the owner of "cellphone" to provide an empathic response rather than an accusatory response such as, "I'm sorry to hear that your son broken his phone", that implies the son is the determined cause for the phone not turning on. The second portion of the response that chatbot program 108 generates includes the potential resolution response of, "What is your son's address? We can send a replacement phone to his dorm room." In addition to chatbot program 108 utilizing the relevancy scores to re-enforce the third relationship of "son" being the owner of "cellphone", chatbot program 108 utilizes information provided in the response received from the user in (214) to tailor both the response and the resolution. Since the user previously stated, "The phone was dropped into his dorm room sink filled with water and now the phone won't turn on", chatbot program 108 determines the "son" and not "John Doe" requires the phone replacement. Furthermore, chatbot program 108 determines the issue occurred near "his dorm room sink" and therefore, chatbot program 108 generates a response with a resolution to send the replacement phone to the "dorm room".

In other embodiments, chatbot program 108 can perform an action (e.g., initialize a shipment, initialize a repair), in conjunction with generating the response based on the updated set of relevancy scores. Continuing from the previously discussed example, chatbot program 108 initializes a shipment for the "cellphone" to the "son" of "John Doe" based on the entities and relationships pulled from the from the chatbot conversation. Chatbot program 108 can include one or more questions in the generated response to perform the action of initializing the shipment (e.g., "what is your son's address"). In another example, chatbot program 108 initializes a repair based on the entities and relationships pulled from the chatbot conversations.

Chatbot program 108 determines (decision 220) whether the chatbot conversation with the user has ended. In the event chatbot program 108 determines the chatbot conversation with the user has not ended ("no" branch, decision 220), chatbot program 108 receives (214) a response from the user. In the event chatbot program 108 determines the chatbot conversation with the user has ended ("yes" branch, decision 220), chatbot program 108 ceases operations and can store a transcript of the chatbot conversation with the user.

Figure 3A:
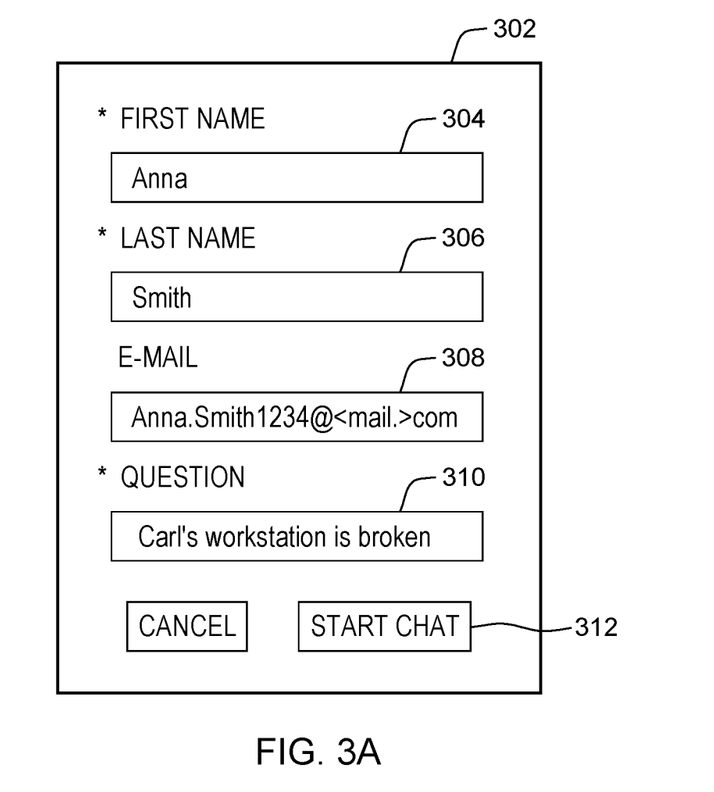
FIG. 3A illustrates an example of a chatbot program receiving information for initialization of a chatbot conversation, in accordance with an embodiment of the present invention.

FIG. 3A illustrates an example of a chatbot program receiving information for initialization of a chatbot conversation, in accordance with an embodiment of the present invention. In this embodiment, chatbot program 108 prompts a user via a user interface to enter basic identification information and a topic to be discussed during the chatbot conversation into chatbot window 302. Chatbot window 302 includes first name field 304, last name field 306, and email address field 308 for identification information entry by a user for initializing the chatbot conversation. First name field 304 and last name field 306 are required fields for identification information entry and email address field 308 is not a required field for identification information entry, since chatbot program 108 can utilizes the provided email address to send a transcript of the chatbot conversation to the user. The user provides the "Anna" in first name field 304, "Smith" in last name field 306, and "Anna.Smith1234@<mail>.com" in email address field 308. Chatbot window includes question field 310 for topic entry by the user. In this embodiment, a statement of "Carl's workstation is broken" is provide rather than a question in question field 310. Chatbot program 108 initializes the chatbot conversation subsequent to the user selecting start chat 312 in chatbot window 302.

Figure 3B:
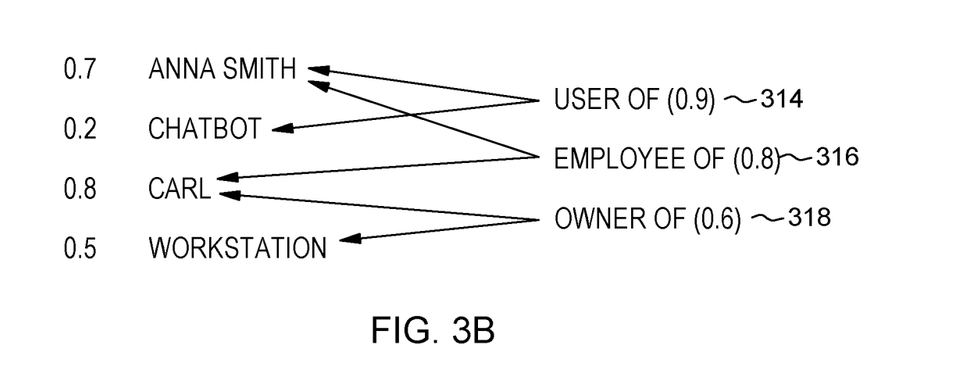
FIG. 3B illustrates an example of a chatbot program determining an initial set of relevancy scores for identified entities and relationships, in accordance with an embodiment of the present invention.

FIG. 3B illustrates an example of a chatbot program determining an initial set of relevancy scores for identified entities and relationships, in accordance with an embodiment of the present invention. As previously discussed in FIG. 3A, chatbot program 108 receives basic identification information via a chatbot interface that includes a first name, "Anna" and a last name, "Smith", where a topic includes a statement, "Carl's workstation is broken". Chatbot program 108 identifies the entities by determining which of the present terms exceed a base relevancy threshold. Chatbot program 108 utilizes the prerequisite knowledge store to identify each term and an associated base relevancy score, where chatbot program 108 compares the associated base relevancy score for each term to the base relevancy threshold. Chatbot program 108 identifies the following terms and associated base relevancy scores: "Anna" (name, noun)=0.2, "Smith" (name, noun)=0.2, "chatbot"=0.01, "Carl" (noun, title)=0.05, "workstation" (domain word)=0.05, "is"=0.00001, "broken" (domain word)=0.02. Chatbot program 108 identifies first relationship 314, where "Anna Smith" is a user of "chatbot". Chatbot program 108 identifies second relationship 316, where "Carl" is the employee of "Anna Smith" based on an employee directory identifying Anna Smith as a manger of Carl. Chatbot program 108 identifies third relationship 318, where "Carl" is the owner of "workstation".

Chatbot program 108 determines the initial set of relevancy scores based on the prerequisite knowledge store. For first relationship 314, chatbot program 108 determines a relevancy score of 0.7 for "Anna Smith" and 0.2 for "chatbot", where a relevancy score for first relationship 314 between "Anna Smith" and "chatbot" is 0.9. For second relationship 316, chatbot program 108 determines a relevancy score of 0.8 for "Carl", where a relevancy score for second relationship 316 between "Anna Smith" and "Carl" is 0.8. For third relationship 318, chatbot program determines a relevancy score of 0.5 for "workstation", where a relevancy score for third relationship 318 between "Carl" and "workstation" is 0.6.

Figure 3C:
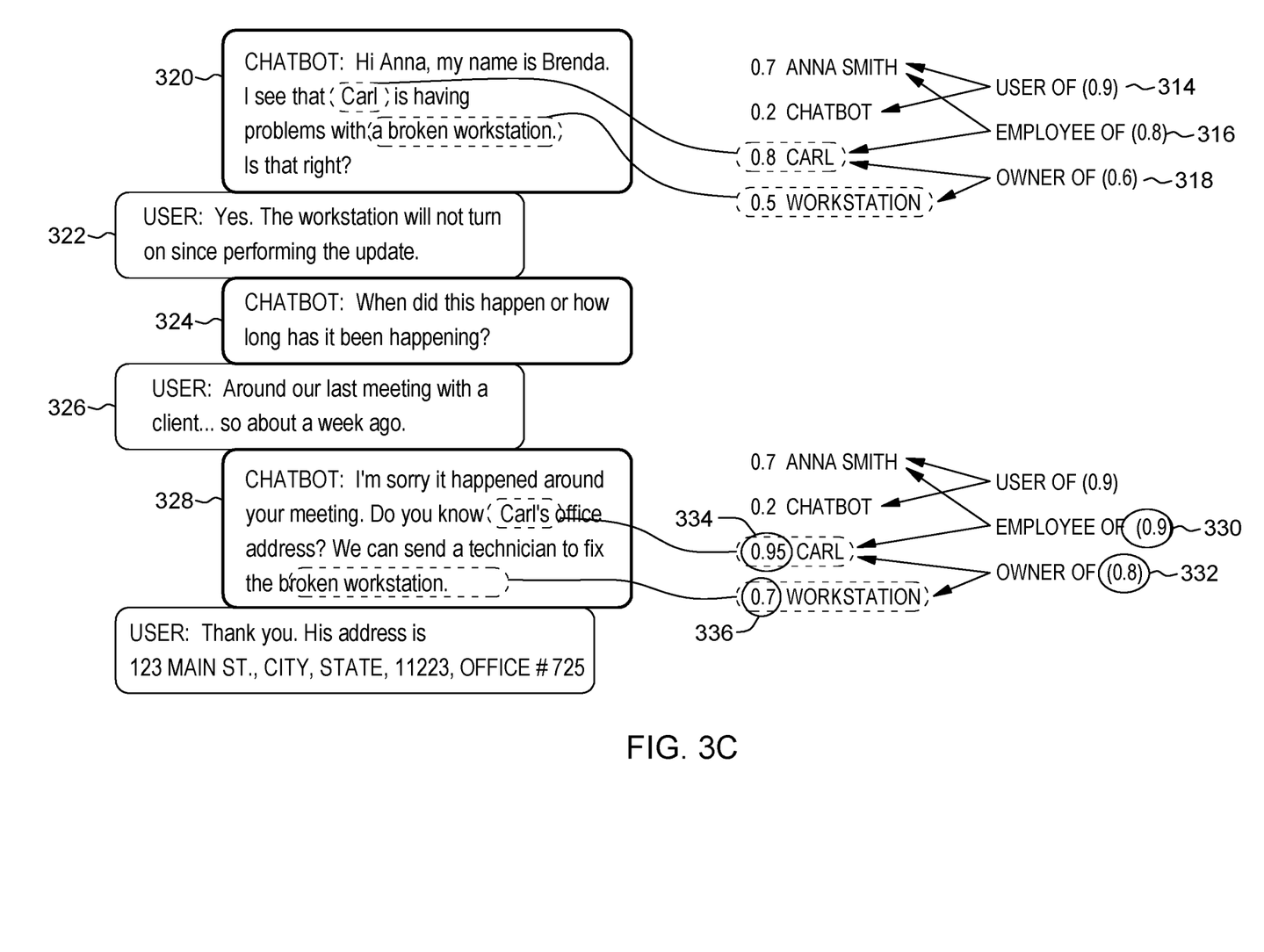
FIG. 3C illustrates an example of a chatbot program engaging in a conversation with a user and generating responses based on updated relevancy scores for the identified entities and relationships, in accordance with an embodiment of the present invention.

FIG. 3C illustrates an example of a chatbot program engaging in a conversation with a user and generating responses based on updated relevancy scores for the identified entities and relationships, in accordance with an embodiment of the present invention.

In this embodiment, chatbot program 108 generates initial generated response 320 tailored to the user engaging in the chatbot conversation by incorporating terms associated with the initial set of relevancy scores for the present entities and relationships. Initial generated response 320 states, "Hi Anna, my name is Brenda. I see that Carl is having problems with a broken workstation. Is the right?". Since, chatbot program 108 previously determined a relevancy score of 0.8 for the second relationship between "Anna Smith" and "Carl", chatbot program 108 incorporates second relationship 316 of "Carl" being the employee of "Anna Smith" into initial generated response 320. Chatbot program 108 includes first portion of initial generated response 320 stating, "Carl" directed at "Anna" who is engaging in the chatbot conversation. Since, chatbot program 108 previously determined a relevancy score of 0.6 for third relationship 318 between "Carl" and "workstation", chatbot program 108 incorporates third relationship 318 of "Carl" being the owner of "workstation" into initial generated response 320. Chatbot program 108 includes a second portion of initial generated response 320 stating, "a broken workstation". Chatbot program 108 further includes a question in initial generated response 320 directed to the user, where chatbot program 108 utilizes a received response from the user to confirm that initial generated response 320 is properly tailored to the user engaging in the chatbot conversation.

Chatbot program 108 receives user response 322 stating, "Yes. The workstation will not turn on since preforming the update." Chatbot program 108 further engages the user for additional information by generating response 324 stating, "When did this happen or how long has it been happening?" Chatbot program 108 receives additional user response 326 stating, "Around our last meeting with a client . . . so about a week ago." Chatbot program 108 updates the initial set of relevancy scores based on the response from the user. Chatbot program 108 parses user response 322 and identifies a confirmation (i.e., "Yes.") to the previous presented question in initial generated response 320. Chatbot program 108 utilizes the confirmation to update relevancy score 330 for second relationship between "Anna Smith" and "Carl" from 0.8 to 0.9, since the confirmation is at least partially directed to the "Carl" being the employee of "Anna Smith". Chatbot program 108 further utilizes the confirmation to update relevancy score 332 for third relationship 318 between "Carl" and "workstation" from 0.6 to 0.8, since the confirmation is at least partially directed to the "Carl" being the owner of "workstation". Furthermore, chatbot program 108 updates relevancy score 334 for "Carl" from 0.8 to 0.95 and relevancy score 336 for "workstation" from 0.5 to 0.7.

Chatbot program 108 generates resolution response 328 based on the updated set of relevancy scores that states, "I'm sorry it happened around your meeting. Do you know Carl's office address? We can send a technician to fix the broken workstation." The first portion of the response that chatbot program 108 generates includes the empathic response of, "I'm sorry it happened around your meeting." Chatbot program 108 utilizes the relevancy scores to re-enforce third relationship 318 of "Carl" being the owner of "workstation" to provide the empathic response. The second portion of the response that chatbot program 108 generates includes the potential resolution response of, "Do you know Carl's office address? We can send a technician to fix the broken workstation." In addition to chatbot program 108 utilizing the relevancy scores to re-enforce third relationship 318 of "Carl" being the owner of "workstation", chatbot program 108 utilizes information provided in user response 322 to tailor the resolution in generated resolution response 328. Since the user previously stated, "Carl's workstation is broken", chatbot program 108 determines the "Carl" and not "Anna Smith" requires the technician to fix the broken workstation.

Figure 4:
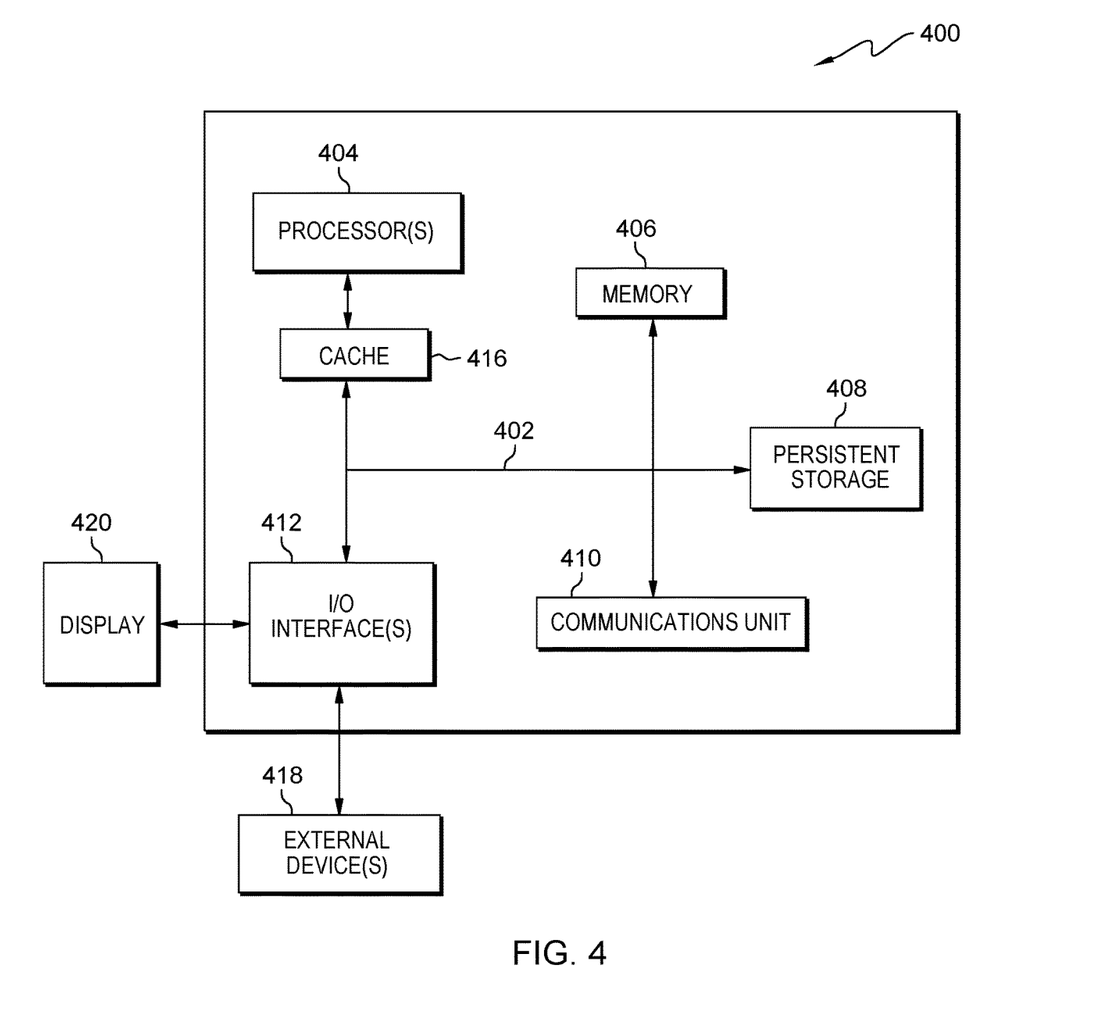
FIG. 4 is a block diagram of components of a computer system, such as the server computer of FIG. 1, in accordance with an embodiment of the present invention.

FIG. 4 depicts computer system 400, where server computer 102 and client device 104 are examples of a computer system 400 that includes cluster compliance program 108A and 108B, respectively. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
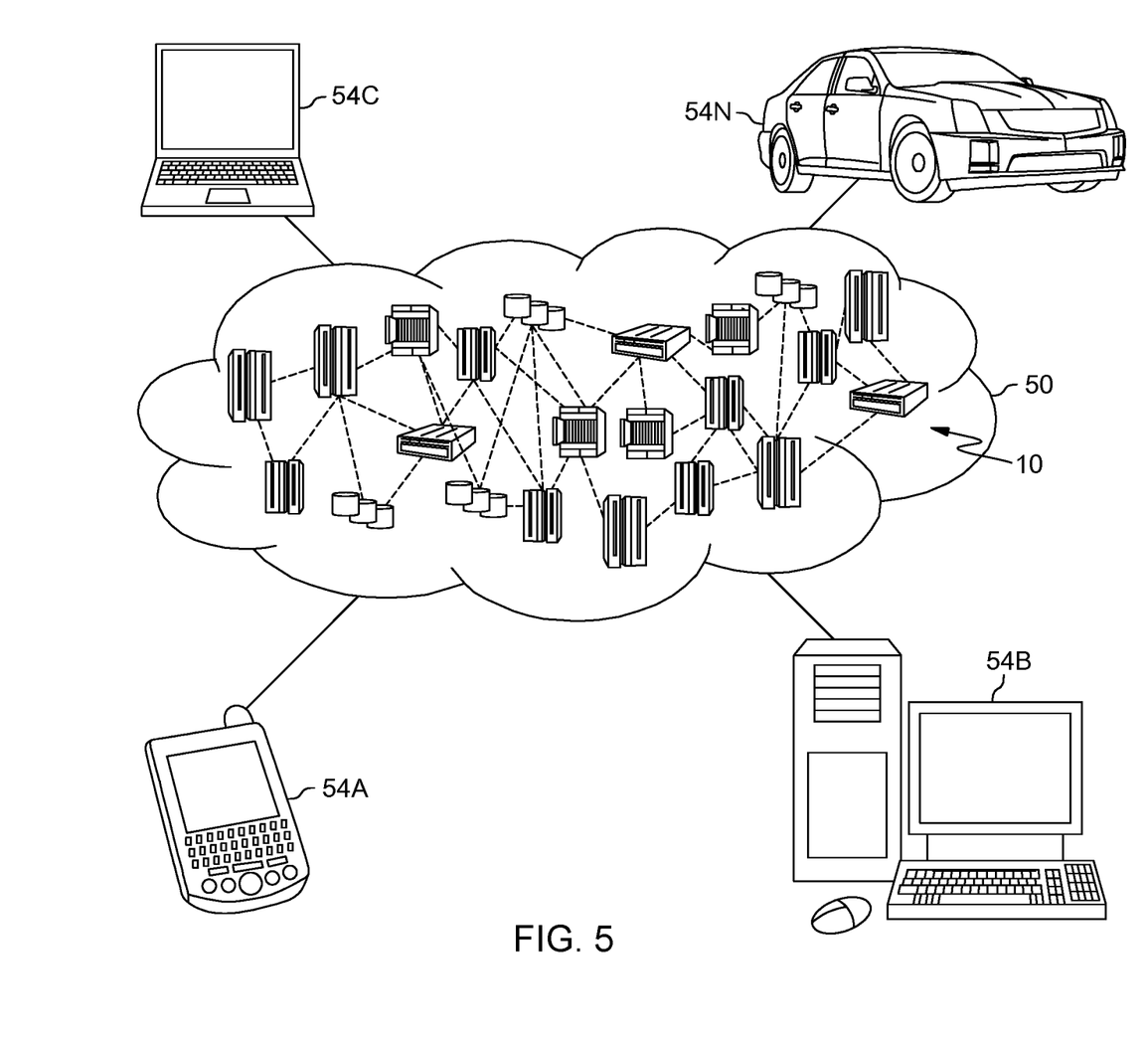
FIG. 5 depicts a cloud computing environment, in accordance with an embodiment of the present invention.
Figure 6:
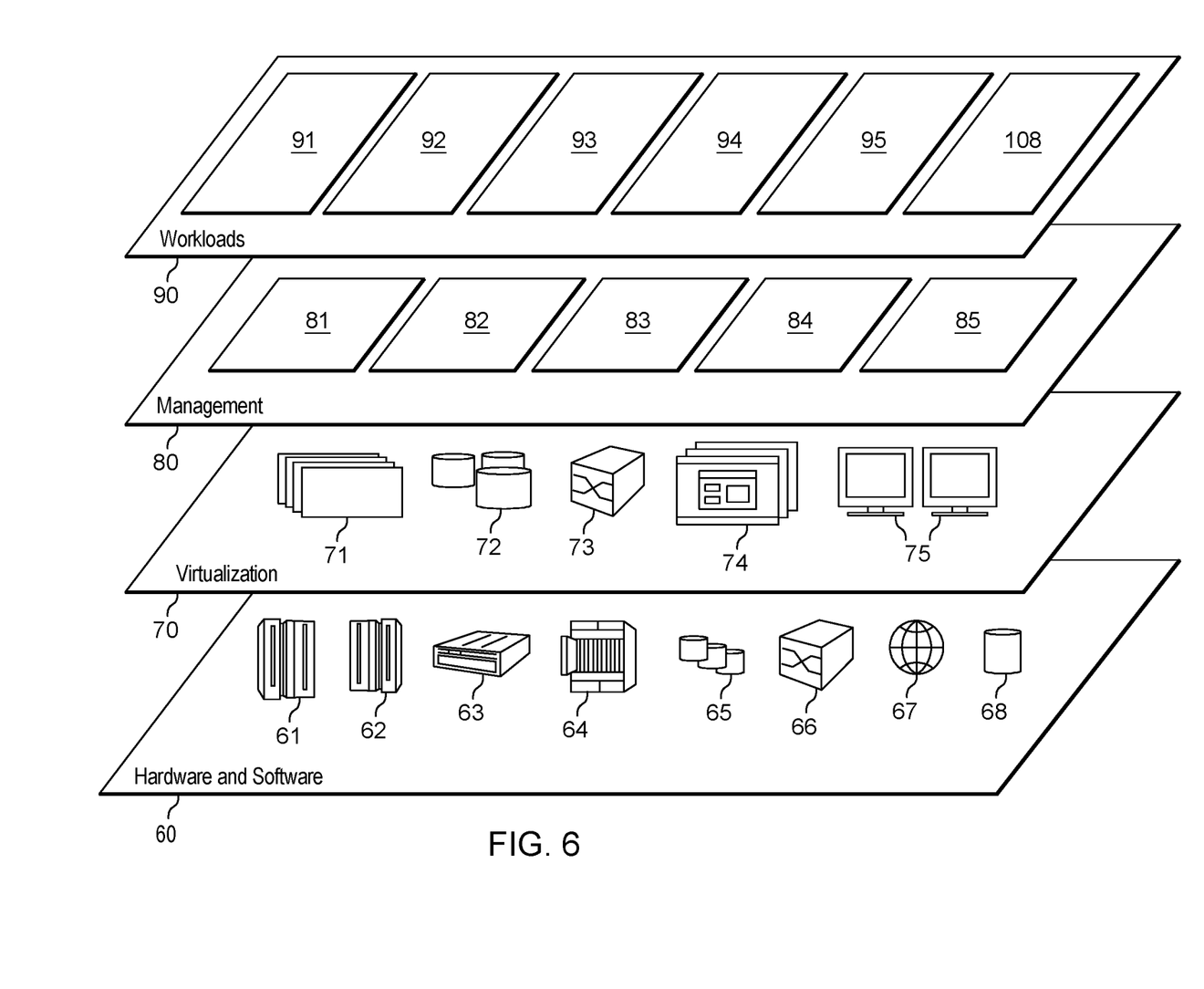
FIG. 6 depicts abstraction model layers, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chatbot program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   generating, by one or more processors, a prerequisite knowledge store based on structured and unstructured data from publicly accessible sources, wherein the prerequisite knowledge store includes a plurality of entities and a plurality of relationships;
   assigning, by one or more processors, a plurality of relevancy scores for the plurality of entities and the plurality of relationships;
   updating, by one or more processors, the prerequisite knowledge store based on a domain for a chatbot;
   responsive to receiving identification information associated with an end user and a topic for a chatbot conversation, initializing, by one or more processors, the chatbot conversation between the chatbot and the end user;
   identifying, by one or more processors, a set of entities and a set of one or more relationships provided by the end user in the identification information and the topic, wherein each relationship from the set one or more relationships is between two entities from the set of entities;
   determining, by one or more processors, an initial set of relevancy scores for each entity in the set of entities and the set of one or more relationships, wherein the initial set of relevancy scores are based at least on the domain for the topic of the chatbot conversation; and
   generating, by one or more processors, a first response to the end user based on the initial set of relevancy scores, wherein the first response includes at least one entity from the set of entities and at least one relationship from of the set of one or more relationships.

2. The method of claim 1, further comprising:
   responsive to receiving a second response from the end user, updating, by one or more processors, the initial set of relevancy scores for the set of entities and the set of one or more relationships, wherein the second response includes a confirmation to a question presented in the first response; and
   generating, by one or more processors, a third response to the end user based on the updated initial set of relevancy scores, wherein the third response includes the least one entity from the set of entities and the at least one relationship from of the set of one or more relationships from the first response.

3. The method of claim 2, wherein the third response includes a resolution to an issue presented in the topic.

4. The method of claim 1, further comprising
   responsive to receiving a second response from the end user, updating, by one or more processors, the initial set of relevancy scores for the set of entities and the set of one or more relationship, wherein the second response includes a rejection to a question presented in the first response; and
   generating, by one or more processors, a third response to the end user based on the updated initial set of relevancy scores, wherein the third response excludes the least one entity from the set of entities and the at least one relationship from of the set of one or more relationships from the first response.

5. The method of claim 1, wherein the plurality of entities includes the set of entities and the plurality of relationships includes the set of one or more relationships.

6. The method of claim 1, wherein updating the prerequisite knowledge store based on the domain for the chatbot is based on a plurality of topics for associated with a plurality of previous chatbot conversations.

7. A computer program product comprising:
   one or more computer readable storage media and program instructions stored on at least one of the one or more storage media, the program instructions comprising:
   program instructions to generate a prerequisite knowledge store based on structured and unstructured data from publicly accessible sources, wherein the prerequisite knowledge store includes a plurality of entities and a plurality of relationships;
   program instructions to assign a plurality of relevancy scores for the plurality of entities and the plurality of relationships;
   program instructions to update the prerequisite knowledge store based on a domain for a chatbot;
   program instructions to, responsive to receiving identification information associated with an end user and a topic for a chatbot conversation, initialize the chatbot conversation between the chatbot and the end user;
   program instructions to identify a set of entities and a set of one or more relationships provided by the end user in the identification information and the topic, wherein each relationship from the set one or more relationships is between two entities from the set of entities;
   program instructions to determine an initial set of relevancy scores for each entity in the set of entities and the set of one or more relationships, wherein the initial set of relevancy scores are based at least on the domain for the topic of the chatbot conversation; and
   program instructions to generate a first response to the end user based on the initial set of relevancy scores, wherein the first response includes at least one entity from the set of entities and at least one relationship from of the set of one or more relationships.

8. The computer program product of claim 7, further comprising program instructions, stored on the one or more computer readable storage media, which when executed by a processor, cause the processor to:
   responsive to receiving a second response from the end user, update the initial set of relevancy scores for the set of entities and the set of one or more relationships, wherein the second response includes a confirmation to a question presented in the first response; and
   generate a third response to the end user based on the updated initial set of relevancy scores, wherein the third response includes the least one entity from the set of entities and the at least one relationship from of the set of one or more relationships from the first response.

9. The computer program product of claim 8, wherein the third response includes a resolution to an issue presented in the topic.

10. The computer program product of claim 7, further comprising program instructions, stored on the one or more computer readable storage media, which when executed by a processor, cause the processor to:
    responsive to receiving a second response from the end user, update the initial set of relevancy scores for the set of entities and the set of one or more relationship, wherein the second response includes a rejection to a question presented in the first response; and generate a third response to the end user based on the updated initial set of relevancy scores, wherein the third response excludes the least one entity from the set of entities and the at least one relationship from of the set of one or more relationships from the first response.

11. The computer program product of claim 7, wherein the plurality of entities includes the set of entities and the plurality of relationships includes the set of one or more relationships.

12. The computer program product of claim 7, wherein updating the prerequisite knowledge store based on the domain for the chatbot is based on a plurality of topics for associated with a plurality of previous chatbot conversations.

13. A computer system comprising:
one or more computer processors;
one or more computer readable storage media; and
program instructions stored on the computer readable storage media for execution by at least one of the one or more computer processors, the program instructions comprising:
program instructions to generate a prerequisite knowledge store based on structured and unstructured data from publicly accessible sources, wherein the prerequisite knowledge store includes a plurality of entities and a plurality of relationships;
program instructions to assign a plurality of relevancy scores for the plurality of entities and the plurality of relationships;
program instructions to update the prerequisite knowledge store based on a domain for a chatbot;
program instructions to, responsive to receiving identification information associated with an end user and a topic for a chatbot conversation, initialize the chatbot conversation between the chatbot and the end user;
program instructions to identify a set of entities and a set of one or more relationships provided by the end user in the identification information and the topic, wherein each relationship from the set one or more relationships is between two entities from the set of entities;
program instructions to determine an initial set of relevancy scores for each entity in the set of entities and the set of one or more relationships, wherein the initial set of relevancy scores are based at least on the domain for the topic of the chatbot conversation; and
program instructions to generate a first response to the end user based on the initial set of relevancy scores, wherein the first response includes at least one entity from the set of entities and at least one relationship from of the set of one or more relationships.

14. The computer system of claim 13, further comprising program instructions, stored on the one or more computer readable storage media, which when executed by a processor, cause the processor to:
responsive to receiving a second response from the end user, update the initial set of relevancy scores for the set of entities and the set of one or more relationships, wherein the second response includes a confirmation to a question presented in the first response; and
generate a third response to the end user based on the updated initial set of relevancy scores, wherein the third response includes the least one entity from the set of entities and the at least one relationship from of the set of one or more relationships from the first response.

15. The computer system of claim 14, wherein the third response includes a resolution to an issue presented in the topic.

16. The computer system of claim 13, further comprising program instructions, stored on the one or more computer readable storage media, which when executed by a processor, cause the processor to:
responsive to receiving a second response from the end user, update the initial set of relevancy scores for the set of entities and the set of one or more relationship, wherein the second response includes a rejection to a question presented in the first response; and
generate a third response to the end user based on the updated initial set of relevancy scores, wherein the third response excludes the least one entity from the set of entities and the at least one relationship from of the set of one or more relationships from the first response.

17. The computer system of claim 13, wherein the plurality of entities includes the set of entities and the plurality of relationships includes the set of one or more relationships.

18. The computer system of claim 13, wherein updating the prerequisite knowledge store based on the domain for the chatbot is based on a plurality of topics for associated with a plurality of previous chatbot conversations.

* * * * *